US011323195B2

(12) United States Patent
Ambeskar et al.

(10) Patent No.: US 11,323,195 B2
(45) Date of Patent: May 3, 2022

(54) COMMUNICATION SYSTEM AND COMMUNICATION METHOD FOR A FRAME SYNCHRONIZATION (71) Applicant: Hughes Network Systems, LLC, Germantown, MD (US)

(72) Inventors: Nimesh Ambeskar, Germantown, MD (US); Akash Gaikwad, Germantown, MD (US); Yogesh Sethi, Boyds, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 32 days.

(21) Appl. No.: 16/731,706

(22) Filed: Dec. 31, 2019

(65) Prior Publication Data
US 2021/0203427 A1 Jul. 1, 2021

(51) Int. Cl.
H04J 3/06 (2006.01)
G01S 19/25 (2010.01)
H04L 69/28 (2022.01)
H04W 56/00 (2009.01)

(52) U.S. Cl.
CPC .......... H04J 3/0667 (2013.01); G01S 19/256 (2013.01); H04L 69/28 (2013.01); H04W 56/002 (2013.01)

(58) Field of Classification Search
CPC ...... H04J 3/0667; G01S 19/256; H04L 69/28; H04W 56/002
See application file for complete search history.

(56) References Cited

U.S. PATENT DOCUMENTS

2002/0186659 A1* 12/2002 Hazama .................. H04L 43/00
370/241
2015/0098385 A1* 4/2015 Navalekar ............... H04W 4/06
370/312
2017/0127368 A1* 5/2017 Wang .................... H04L 7/0008

* cited by examiner

Primary Examiner — Kiet Tang
(74) Attorney, Agent, or Firm — Global IP Counselors, LLP (57) ABSTRACT A communication system includes a Precision Time Protocol (PTP) grandmaster configured to provide a PTP clock reference via a PTP network, and a server connected to the PTP grandmaster via the PTP network, the server being configured to generate a frame event and a frame number for a frame synchronization based on a synchronization to the PTP clock reference using PTP.

22 Claims, 4 Drawing Sheets

COMMUNICATION SYSTEM AND COMMUNICATION METHOD FOR A FRAME SYNCHRONIZATION

BACKGROUND

Field of the Invention

The present invention generally relates to a communication system and a communication method. More specifically, the present invention relates to a communication system and a communication method for a frame synchronization.

Background Information

Satellite communication systems have emerged as an option for users to establish communication to terrestrial data networks, such as the Internet. Satellite communication systems typically utilize remote terminals or very small aperture terminals (VSATs) at the user locations. The remote terminals allow users to access the terrestrial data networks. The remote terminals are associated with a gateway or ground station which provides a point of connection to the terrestrial data networks for the satellite communication system.

With the satellite communication system, inroute subsystem uses Time-division Multiple Access (TDMA) time slots to allocate bandwidth among the remote terminals. A frame is a standard unit of time period for distributing the bandwidth in distinct time slots among the remote terminals. Specifically, a frame has a predetermined time period, such as 45 ms, and is identified with a frame number.

In particular, frame and timing synchronization is an essential part for the functioning of TDMA based inroute on the satellite communication system. It is required to synchronize the allocation of the inroute bandwidth to the remote terminals and synchronize transmission of data (by the remote terminals) and reception of data at the gateway receivers (demodulators). This mechanism to synchronize timing and frame reference is called "frame synchronization." Specifically, frame markers or events are generated across elements of the gateway, such a modulators, demodulators, TDMA inroute bandwidth allocators and outroute frame packet generators. These frame markers are simultaneous and periodic time events across all the components of the gateway with very low frame event timing error between the components. Each frame event is also tagged with the frame number for frame identification. The frame markers are generated at the gateway using specialized/custom hardware, such as timing generators.

SUMMARY

As mentioned above, timing generators are used as a source of frame marker (SOSF) and frame number reference. Generally, the timing generators use Global Positioning System (GPS) signal as an input reference.

However, when such specialized/custom hardware is utilized as a source of frame marker, the gateway also need to have specialized/custom hardware to distribute the timing marker among the components of the gateway, which increases the cost of the gateway. For example, timing distribution units (TXM, RXM) need to be provided for distributing timing and frequency references.

One object is to provide a communication system with which frame synchronization can be performed without using specialized/custom hardware for the frame synchronization.

In view of the state of the known technology, a communication system is provided that includes a Precision Time Protocol (PTP) grandmaster configured to provide a PTP clock reference via a PTP network, and a server connected to the PTP grandmaster via the PTP network, the server being configured to generate a frame event and a frame number for a frame synchronization based on a synchronization to the PTP clock reference using PTP.

Furthermore, a communication method is provided that includes obtaining, by a server, a PTP clock reference from a Precision Time Protocol (PTP) grandmaster via a PTP network, the server being connected to the PTP grandmaster via the PTP network, and generating, by the server, a frame event and a frame number for a frame synchronization based on a synchronization to the PTP clock reference using PTP.

Also, other features, aspects and advantages of the disclosed communication system will become apparent to those skilled in the field of the communication system from the following detailed description, which, taken in conjunction with the annexed drawings, discloses several illustrative embodiments of a communication system with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
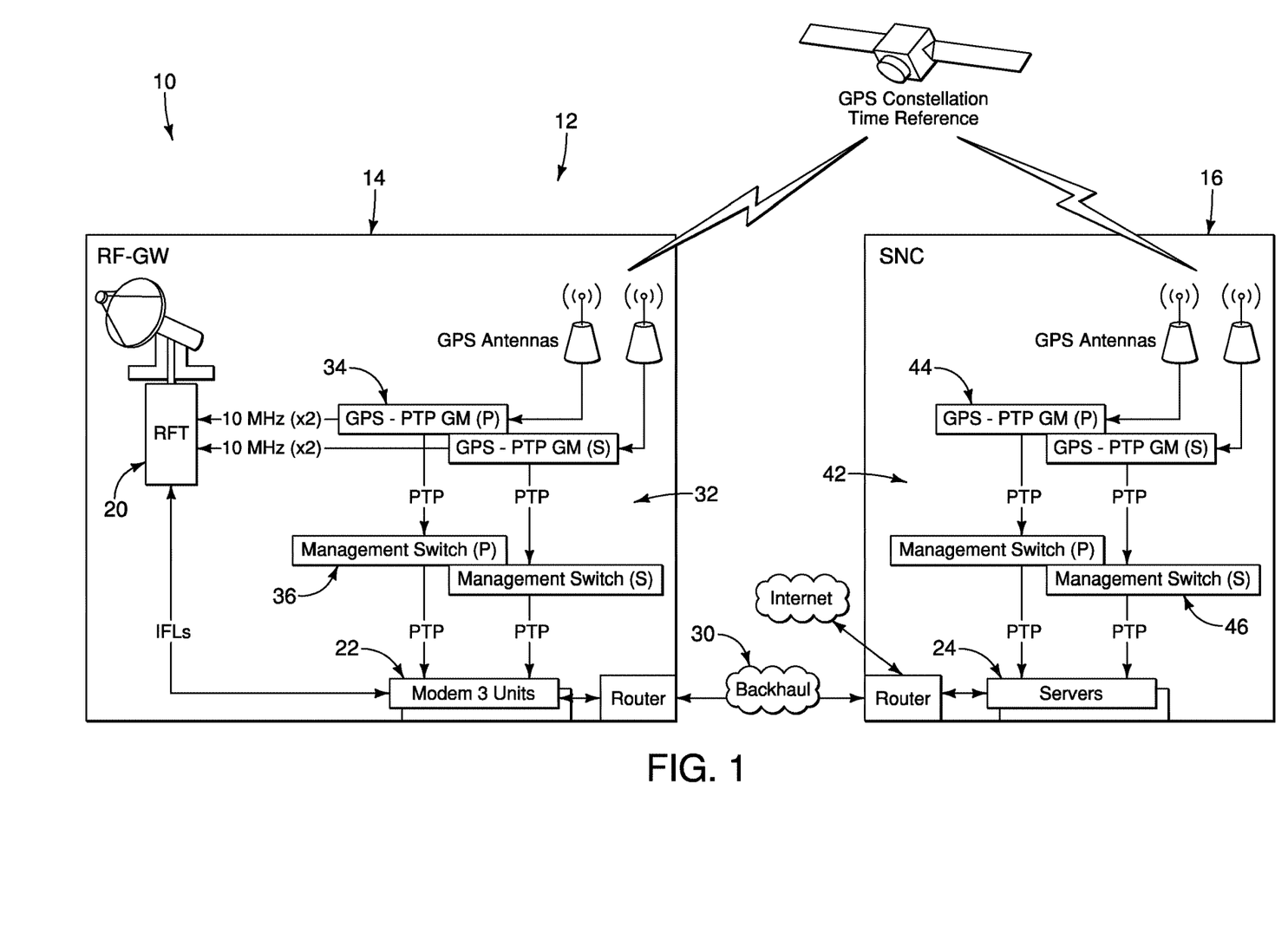
FIG. 1 illustrates an example of a satellite communication system according to one embodiment.

FIG. 1 illustrates an example of a satellite communication system 10 (e.g., communication system) according to an exemplary embodiment. In the illustrated embodiment, a communication method for frame synchronization using Precision Time Protocol (PTP). The PTP is a synchronization protocol defined in IEEE 1588 to synchronize host clocks throughout a local area network.

As shown in FIG. 1, the satellite communication system 10 includes a terrestrially mounted satellite gateway 12 with a radio frequency gateway (RFGW) 14 and a satellite network core (SNC) 16. In the illustrated embodiment, the gateway functionality is split into the RFGW 14 and SNC 16. With this configuration, the satellite gateway 12 provides remote terminals or very small aperture terminals (VSATs) with the Internet access via a communication satellite through a satellite communication network.

FIG. 1 illustrates components of the gateway 12 related to a gateway timing architecture or subsystem. However, of course, the gateway 12 can include other components, as understood in the field of the communication system.

In the illustrated embodiment, the RFGW 14 basically provides physical layer functions, such as an interface to a radio frequency terminal (RFT) 20, modulation/demodulation and the like. Specifically, the RFGW 14 primarily includes hardware entities, such as modem units 22 (e.g., modems) with modulators and demodulators, that run on Xilinx SOC (System on a chip) based embedded platforms, for example.

Furthermore, in the illustrated embodiment, the SNC 16 provides link and network layer functions, such as Internet point of presence, link layer processing, IP processing, web acceleration, and the like. These functions are performed by software entities, such as Inroute Group Manager (IGM), Code Rate Organizer (CRO), IP gateway (IPGW), and the like, hosted on servers 24. The servers 24 can include an electronic controller, a processor or a microcomputer that can host the software entities.

In the illustrated embodiment, the RFGW 14 and the SNC 16 are located at separate locations, respectively, and are connected to each other via a communication network or backhaul network 30. In the illustrated embodiment, a single RFGW 14 and a single SNC 16 are illustrated in FIG. 1. However, multiple RFCWs and multiple SNCs can be connected to the communication network 30 for providing redundancy of the satellite communication system 10. In the illustrated embodiment, the path delays between the RFGW 14 and the SNC 16 can be variable. Furthermore, in the case of multiple RFCWs and multiple SNCs being connected to the communication network 30, there can be more than one path between any pairs of the RFGWs and the SNCs.

With these configurations of the RFGW 14 and the SNC 16, inroute and outroute subsystems of the satellite gateway 12 can be formed.

Referring further to FIG. 1, the satellite communication system 10 utilizes the PTP for frame synchronization. In the illustrated embodiment, as illustrated in FIG. 1, the RFGW 14 has a PTP network or local area network 32 on which two sets (i.e., a primary set and a secondary set) of a PTP grandmaster 34 and a PTP aware or management switch 36 are provided. In the illustrated embodiment, the two sets of the PTP grandmaster 34 and the PTP aware switch 36 are provided for providing redundancy of timing subsystem of the satellite gateway 12. However, of course, only one set or more than two sets of the PTP grandmaster 34 and the PTP aware switch 36 can be provided as needed and/or desired.

In the illustrated embodiment, the PTP grandmaster 34 provides a master clock reference using GPS constellation time reference or GPS signal as a time source. As illustrated in FIG. 1, the GPS signal is obtained through a GPS antenna by the PTP grandmaster 34. The PTP aware switch 36 is connected to the PTP grandmaster 34 via the PTP network 32 using the PTP, and relays and distributes the master clock reference as a PTP clock to target modem units 22, which serves as slave nodes of the PTP network 32.

With these configurations, the satellite communication system 10 can use the PTP to synchronize host clocks of the modem units 22 (e.g., modulator and demodulator clocks) in the RFGW 14 to the GPS time and frequency reference.

Similarly, as illustrated in FIG. 1, the SNC 16 has a PTP network or local area network 42 on which two sets (i.e., a primary set and a secondary set) of a PTP grandmaster 44 and a PTP aware or management switch 46 are provided. In the illustrated embodiment, the two sets of the PTP grandmaster 44 and the PTP aware switch 46 are provided for providing redundancy of timing subsystem of the satellite gateway 12. However, of course, only one set or more than two sets of the PTP grandmaster 44 and the PTP aware switch 46 can be provided as needed and/or desired.

In the illustrated embodiment, the PTP grandmaster 44 provides a master clock reference using GPS constellation time reference or GPS signal as a time source. As illustrated in FIG. 1, the GPS signal is obtained through a GPS antenna by the PTP grandmaster 44. The PTP aware switch 46 is connected to the PTP grandmaster 44 via the PTP network 42 using the PTP, and relays and distributes the master clock reference as a PTP clock to the servers 24, which serves as slave nodes of the PTP network 42.

With these configurations, the satellite communication system 10 uses the PTP to synchronize host clocks of the servers 24 in the SNC 16 to the GPS time and frequency reference. Also, the PTP is used at the SNC 16 to derive frame markers (frame events) and number references for the IGM and the CRO. The IGM performs inroute link layer functions, such as inroute bandwidth allocation and packet reassembly into IP packets. The CRO is outroute link layer processing element that is responsible to generate timing packet reference (SFNP) for remote terminal timing synchronization. Both of the IGM and the CRO requires the frame marker reference to perform its functions. The generation of the frame markers (the frame events) and the frame numbers will be described in detail later.

In the illustrated embodiment, the PTP grandmasters 34 and 44 of the RFGW 14 and the SNC 16 has a common or single time source. Specifically, the PTP grandmasters 34 and 44 uses the GPS signal as the common time source. Thus, once the host clocks of the modem units 22 and the servers 24 are synchronized to the master clock references of the PTP grandmasters 34 and 44, respectively, then the RFGW 14 and the SNC 16 can also be synchronized with respect to each other regardless of the network quality of the backhaul network 30 between the RFGW 14 and the SNC 16. Also, even if multiple RFGWs and multiple SNCs are provided to the satellite gateway 12, all the RFGWs and the SNCs can also be synchronized in the same manner regardless of the number of paths between the RFGWs and the SNCs. In the illustrated embodiment, the GPS signal is utilized as the common time source. However, the PTP grandmasters 34 and 44 of the RFGW 14 and the SNC 16 can have a common time source other than the GPS signal, as needed and/or desired.

Referring now to FIGS. 2-5, the generation of the frame markers (the frame events) and the frame numbers using the PTP will be described in detail.

In the illustrated embodiment, the inroute and outroute frame numbers and frame markers (frame events) are derived from the timeofday (ToD) of the inroute and outroute subsystem's host clock. Specifically, the modem units 22 (IDM and OMM FPGA) at the RFGW 14 have the host clocks that are synchronized to the GPS receiver (i.e., the PTP grandmaster 34) using the PTP, respectively, as mentioned above. Similarly, the IGM and the CRO at the SNC 16 are hosted on the servers 24 that have the host clocks synchronized to the GPS receiver (i.e., the PTP grandmaster 44) using the PTP, respectively. Thus, the host clocks on the RFGW 14 and the SNC 16 are synchronized in time such that the frame number could be derived from the respective clock's ToD. Therefore, in the illustrated embodiment, the hardware entities, such as modulators and demodulators, and the software entities, such as bandwidth allocators, have the clocks that are synchronized to the GPS signal using the PTP on their respective local networks 32 and 42. Thus, all the clocks on the elements or components of the satellite gateway 12 can be synchronized in time such that the frame numbers and the frame markers (the frame events) can be derived from the respective clock's ToD.

The PTP clocks provided through the PTP networks 32 and 42 use International Atomic time (TAI) standard. The TAI is a continuous counting of time unlike the UTC which requires leap second adjustment. Therefore, a PTP clock's ToD can be used as common and continuous frame marker reference by both RFGW 14 and the SNC 16.

More specifically, the epoch time of—1 Jan. 1970 12:00: 00.000000 is used as a ToD corresponding to a common frame zero reference by both inroute and outroute subsystems at the RFGW 14 and the SNC 16. In other words, the modem units 22 (IDM and OMM FPGA), the IGM and the CRO use the epoch time as a frame count or number "0" for the TDMA frame numbering scheme of the satellite communication system 10.

Figure 2:
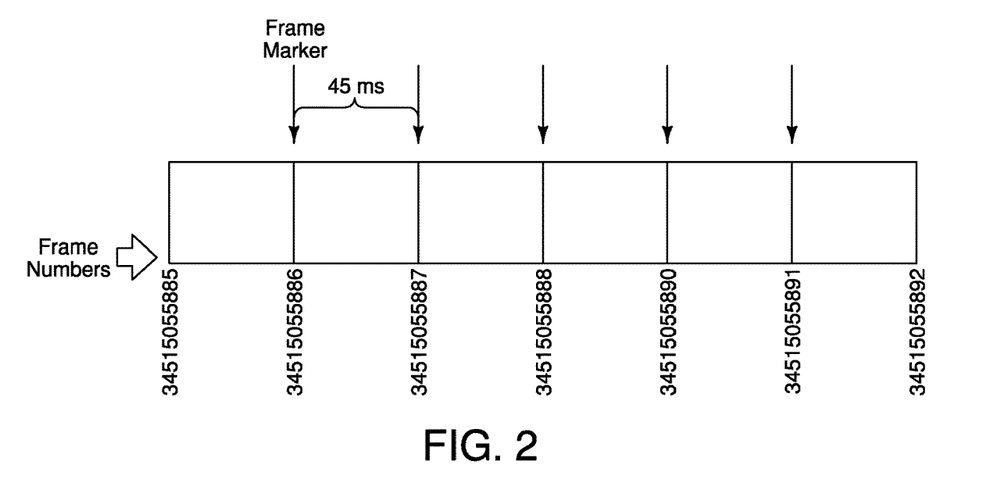
FIG. 2 illustrates a schematic diagram illustrating frame markers (frame events) and frame numbers for frame synchronization.

Specifically, as illustrated in FIG. 2, every increment of a frame time (e.g., a frame time length) in the ToD from the epoch time represents a predetermined frame marker timing (a predetermined frame event timing) for the components of the satellite gateway 12. In the illustrated embodiment, the frame (TDMA frame) has a predetermined frame time (e.g., a predetermined interval), such as 45 milliseconds (ms). Thus, every 45 ms increment in the ToD from the frame zero time reference represents the predetermined frame marker timing (the predetermined frame event timing).

Also, as illustrated in FIG. 2, the frame number increments by one for every passing of the frame time (i.e., a frame marker time). Thus, in the illustrated embodiment, the frame number increments by one for every 45 ms passing of the ToD, for example.

Figure 3:
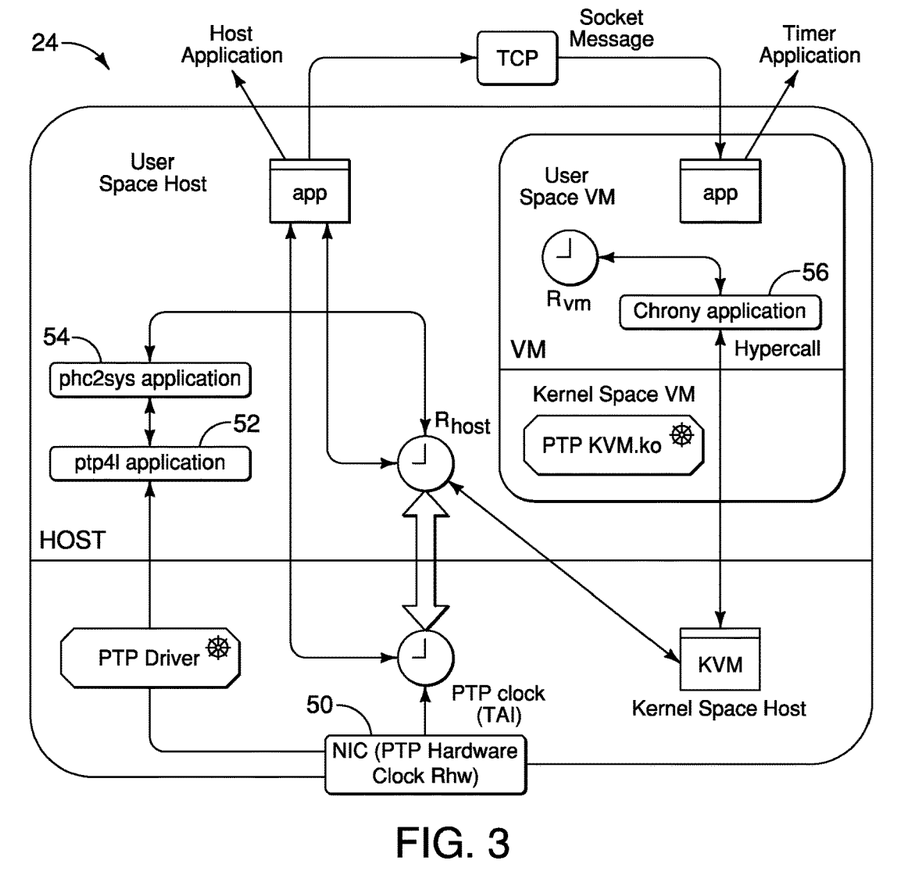
FIG. 3 illustrates a schematic block diagram of a software architecture of a satellite network core of the satellite communication system shown in FIG. 1.

FIG. 3 illustrates a software architecture for the frame synchronization in a Linux VM system to generate the frame markers (the frame events) synchronized to the PTP clock (TAI), i.e., the PTP clock's ToD. In the illustrated embodiment, the server 24 is used with Linux host OS and applications, such as the IGM, the CRO and the like, running on a guest or virtual machine OS (KVM), for example. The application (IGM/CRO) is running an application timer in VM's user space that generates the frame markers (the frame events), as will be discussed later.

As shown in FIG. 3, the system on the server 24 includes three clocks: a host system clock $R_{host}$, a virtual machine clock $R_{vm}$, and a PTP hardware clock $R_{hw}$. The host system clock $R_{host}$ is the host's system clock, the virtual machine clock $R_{vm}$ is KVM's system clock, and the PTP hardware clock $R_{hw}$ is the PTP clock (TAI) on a NIC interface 50 that is running the TAI clock and is master to the system clocks. In the illustrated embodiment, PTP4l linux application 52 synchronizes the PTP clock to the GPS signal using the PTP protocol, Phc2sys linux application 54 synchronizes the host system clock $R_{host}$ to the PTP clock, and Chrony linux application 56, running on VM kernel space, synchronizes the virtual machine clock $R_{vm}$ with the host system clock $R_{host}$. With this configuration, the host system clock $R_{host}$ and the virtual machine clock $R_{vm}$ can be synchronized to the PTP clock and the GPS signal.

In the illustrated embodiment, Linux monotonic timer is used by a timer application to generate the frame markers (the frame events) every 45 ms by taking reference from the PTP clock (TAI). However, KVM user space applications generally cannot access the PTP hardware clock $R_{hw}$ directly. Therefore, the timer application derives the TAI time from the PTP clock based on following calculations:

$R_{host}$=Realtime clock of host OS $R_{vm}$=Realtime clock of VM OS $TAI$=International atomic time $TAI_{diff}=TAI-R_{host}$ $R_{diff}=R_{vm}-R_{host}$ $X=TAI-R_{vm}=TAI_{diff}-R_{diff}$ $$TAI=TAI_{diff}-R_{diff}-R_{vm} \quad (1)$$

In the illustrated embodiment, the timer application is getting $TAI_{diff}$ value via socket message from an application running on the host OS to calculate the TAI time.

In the illustrated embodiment, a timer (timer thread) is created using monotonic system clock in Linux. A monotonic clock cannot be adjusted in time and runs continuously. The timer is set to expire every 45 ms to generate the frame markers (the frame events).

Furthermore, the timer needs to be aligned to the predetermined frame marker timing in ToD defined by the PTP clock reference. This is achieved by calculating a timer offset relative the frame marker (relative to the predetermined frame marker timing (the predetermined frame event timing), and then starting the timer from the calculated timer offset. In the illustrated embodiment, this timer offset is calculated based on the following calculations:

$$\text{frame number} = \frac{TAI \text{ time in ns}}{45000000} \quad \text{(Formula (2))}$$

frame number = (int) frame number + fraction $$\text{Timer offset (ns)} = \text{fraction} \times 45000000 \quad \text{(Formula (3))}$$

In the illustrated embodiment, with these calculations, the integer part (int) of the frame number calculated based on the formula (2) is utilized as the frame number for application use.

Figure 4:
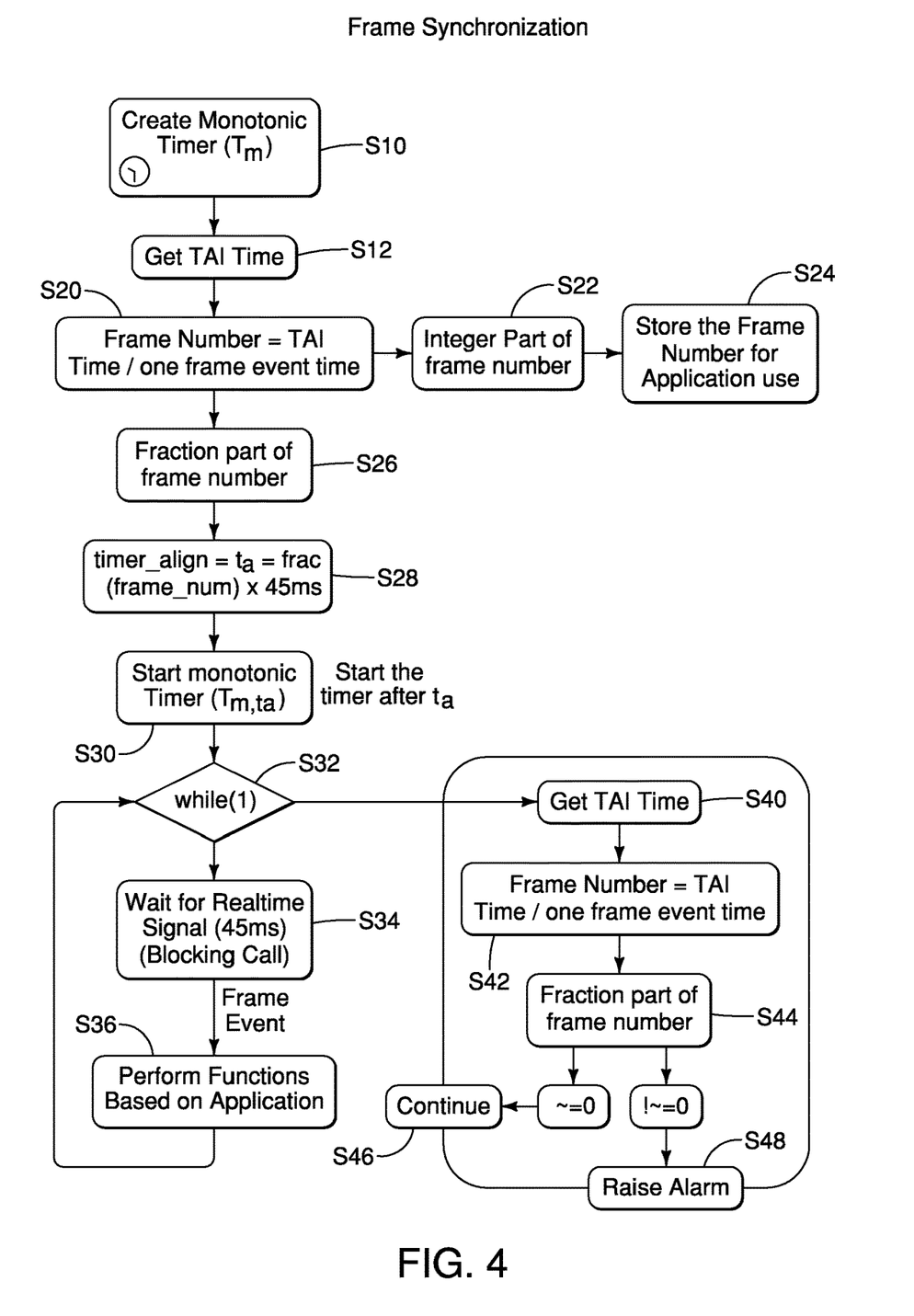
FIG. 4 illustrates a flowchart of the frame synchronization of the satellite communication system shown in FIG. 1.
Figure 5:
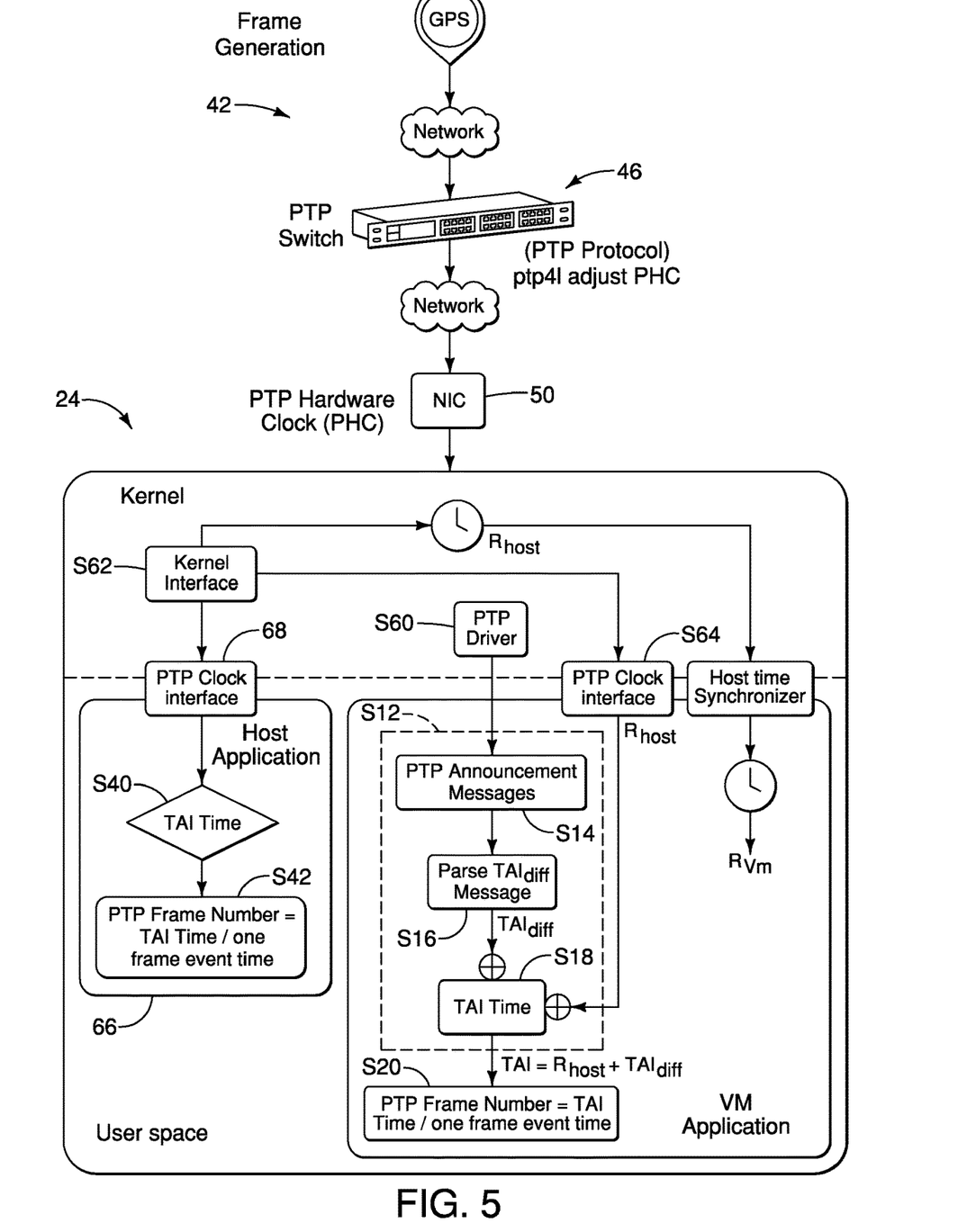
FIG. 5 illustrates a schematic block diagram of a software and hardware architecture of the satellite network core of the satellite communication system shown in FIG. 1.

The timer is started at the calculated timer offset and set to expire every 45 ms, thereby generating the frame marker (the frame event) aligned to the predetermined frame marker timing (the predetermined frame event timing) in ToD defined by using the epoch time as a ToD corresponding to the frame zero reference Referring now to FIGS. 4 and 5, the timer application (or VM application) to generate the frame markers (the frame events) and the frame numbers will be further described in detail.

First, the timer application creates the monotonic timer (Tm) (step S10). Then, the timer application derives the TAI time from the PTP clock (TAI) (step S12). Specifically, as illustrated in FIG. 5, the timer application obtains PTP announce messages from a PTP driver 60 (step S14), parses the message to obtain $TAI_{diff}$ value (step S16), and calculates the TAI time (step S18). In the illustrated embodiment, this TAI time is calculated based on the following calculations:

$TAI=R_{host}+TAI_{diff}$ where the host system clock $R_{host}$ is obtained from a kernel interface 62 via a PTP clock interface 64. However, this TAI time can also be calculated based on the formula (1), as mentioned above.

Next, the frame number (PTP frame number) is calculated based on the calculated TAI time based on the formula (2) (step S20), the integer part (int) of the frame number calculated based on the formula (2) is determined (step S22), and this integer part (int) of the frame number is stored for application use in a computer memory (step S24).

Also, after the frame number is calculated in step S20, the fraction part of the frame number calculated based on the formula (2) is determined (step S26). Then, the timer offset (ta: timer_align) is calculated based on the formula (3) (step S28), and the monotonic timer is started after this timer offset (ta) (step S30).

While the monotonic timer is working (step S32), the timer application generates the frame markers (the frame events) every 45 ms. Specifically, the application, such as the IGM, the CRO and the like, waits for realtime signal (blocking call) (step S34), and performs functions based on the application at the timings when the frame markers (the frame events) are generated (step S36).

Furthermore, while the monotonic timer is working (step S32), a host application 66 obtains the TAI time in a manner similar to step S12 based on the host system clock $R_{host}$ obtained from the kernel interface 62 via a PTP clock interface 68. (step S40), and calculates the frame number based on the formula (2) (step S42) to determine the fraction part of the frame number (step S44). Then, if this fraction part of the frame number is approximately equal to zero, then the process is continued and repeated (step S46). On the other hand, if this fraction part of the frame number is not approximately equal to zero, then the host application raises an alarm.

In the illustrated embodiment, the use of the PTP based ToD to generate the frame markers and the frame numbers eliminates the use of specialized/custom hardware for frame timing generation and distribution. This also eliminates the use of specialized/custom hardware at the SNC 16 with the servers 24 for the gateway software entities that require timing reference synchronized to the gateway hardware entities (e.g., the RFT 20 and the modem units 22) that are placed at separate location.

In the illustrated embodiment, the satellite communication system 10 is explained as an example of a communication system of the present invention. However, the present invention can be applicable to any communication network that uses TDMA as a return channel access mechanism.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A communication system comprising:
    a Precision Time Protocol (PTP) grandmaster configured to provide a PTP clock reference via a PTP network; and
    a server connected to the PTP grandmaster via the PTP network, the server being configured to generate a frame event and a frame number for a frame synchronization based on a synchronization to the PTP clock reference using PTP,
    the server having an application that is programmed to generate the frame event at a predetermined interval synchronized to the PTP clock reference,
    the predetermined interval counted by an application timer of the application that is synchronized to a frame event timing defined by a time of the PTP clock reference.

2. The communication system according to claim 1, further comprising
    a modem connected to the server via a communication network.

3. The communication system according to claim 2, further comprising
    an additional PTP grandmaster configured to provide an additional PTP clock reference via an additional PTP network,
    the modem being connected to the additional PTP grandmaster via the additional PTP network, the modem being configured to be operated based on a synchronization to the additional PTP clock reference.

4. The communication system according to claim 3, wherein
    the PTP grandmaster and the additional PTP grandmaster has a common time source to synchronize the server and the modem to the common time source.

5. The communication system according to claim 4, wherein
    the common time source includes a Global Positioning System (GPS) signal.

6. The communication system according to claim 1, wherein
    the application is programmed to generate the frame number based on the time of the PTP clock reference.

7. The communication system according to claim 1, wherein
the application is programmed to calculate at least a portion of the frame number based on the time of the PTP clock reference.

8. A communication system comprising:
a Precision Time Protocol (PTP) grandmaster configured to provide a PTP clock reference via a PTP network; and
a server connected to the PTP grandmaster via the PTP network, the server being configured to generate a frame event and a frame number for a frame synchronization based on a synchronization to the PTP clock reference using PTP,
the server having an application that is programmed to generate the frame number based on a time of the PTP clock reference,
the application further programmed to derive the time of the PTP clock reference based on a time of a system clock of the server and a difference between the time of the system clock of the server and the time of the PTP clock reference.

9. The communication system according to claim 8, wherein
the application is programmed to generate the frame event at a predetermined interval synchronized to the PTP clock reference.

10. The communication system according to claim 9, wherein
the predetermined interval is counted by an application timer of the application that is synchronized to a frame event timing defined by the time of the PTP clock reference.

11. A communication system comprising:
a Precision Time Protocol (PTP) grandmaster configured to provide a PTP clock reference via a PTP network; and
a server connected to the PTP grandmaster via the PTP network, the server being configured to generate a frame event and a frame number for a frame synchronization based on a synchronization to the PTP clock reference using PTP,
the server having an application that is programmed to generate the frame number based on a time of the PTP clock reference,
the application further programmed to generate the frame number by dividing the time of the PTP clock reference by a frame time length.

12. A communication method performed by a system including a server, the communication method comprising:
obtaining, by the server, a PTP clock reference from a Precision Time Protocol (PTP) grandmaster via a PTP network, the server being connected to the PTP grandmaster via the PTP network; and
generating, by the server, a frame event and a frame number for a frame synchronization based on a synchronization to the PTP clock reference using PTP,
the generating of the frame event further including generating, by an application of the server, the frame event at a predetermined interval synchronized to the PTP clock reference,
the predetermined interval counted by an application timer of the application that is synchronized to a frame event timing defined by a time of the PTP clock reference.

13. The communication method according to claim 12, wherein
the server is further connected to a modem via a communication network.

14. The communication method according to claim 13, further comprising
obtaining, by the modem, an additional PTP clock reference from an additional PTP grandmaster via an additional PTP network, the modem being connected to the additional PTP grandmaster via the additional PTP network,
operating the modem based on a synchronization to the additional PTP clock reference.

15. The communication method according to claim 14, wherein
the PTP grandmaster and the additional PTP grandmaster has a common time source to synchronize the server and the modem to the common time source.

16. The communication method according to claim 15, wherein
the common time source includes a Global Positioning System (GPS) signal.

17. The communication method according to claim 12, wherein
the generating of the frame number further includes generating, by the application of the server, the frame number based on the time of the PTP clock reference.

18. The communication method according to claim 12, wherein
the generating of the frame number further includes calculating, by the application of the server, at least a portion of the frame number based on the time of the PTP clock reference.

19. A communication method performed by a system including a server, the communication method comprising:
obtaining, by the server, a PTP clock reference from a Precision Time Protocol (PTP) grandmaster via a PTP network, the server being connected to the PTP grandmaster via the PTP network; and
generating, by the server, a frame event and a frame number for a frame synchronization based on a synchronization to the PTP clock reference using PTP,
the generating of the frame number further including generating, by an application of the server, the frame number based on a time of the PTP clock reference,
the generating of the frame number further including deriving, by the application of the server, the time of the PTP clock reference based on a time of a system clock of the server and a difference between the time of the system clock of the server and the time of the PTP clock reference.

20. The communication method according to claim 19, wherein
the generating of the frame event further includes generating, by the application of the server, the frame event at a predetermined interval synchronized to the PTP clock reference.

21. The communication method according to claim 9, wherein
the predetermined interval is counted by an application timer of the application that is synchronized to a frame event timing defined by the time of the PTP clock reference.

22. A communication method performed by a system including a server, the communication method comprising:
obtaining, by the server, a PTP clock reference from a Precision Time Protocol (PTP) grandmaster via a PTP network, the server being connected to the PTP grandmaster via the PTP network; and generating, by the server, a frame event and a frame number for a frame synchronization based on a synchronization to the PTP clock reference using PTP, the generating of the frame number further including generating, by an application of the server, the frame number based on a time of the PTP clock reference, the generating of the frame number further including generating, by the application of the server, the frame number by dividing the time of the PTP clock reference by a frame time length.

\* \* \* \* \*